United States Patent [19]

Smith

[11] 3,727,123
[45] Apr. 10, 1973

[54] BRUSHLESS GENERATOR FIELD GROUND DETECTION SYSTEM

[75] Inventor: Forest D. Smith, Saint Louis Park, Minn.

[73] Assignee: Electric Machinery Mfg. Company, Minneapolis, Minn.

[22] Filed: Feb. 22, 1972

[21] Appl. No.: 228,080

[52] U.S. Cl..................322/99, 317/18 R, 322/26, 324/51, 324/158 MG, 340/255, 340/271
[51] Int. Cl..............................................H02k 11/00
[58] Field of Search.................340/268, 271, 255, 340/190; 322/26, 99; 323/21; 324/51, 158 MG; 317/18 R

[56] References Cited

UNITED STATES PATENTS

| | | | |
|---|---|---|---|
| 3,435,327 | 3/1969 | Merhof et al. | 324/158 MG |
| 3,508,137 | 4/1970 | Hill | 322/26 X |
| 3,593,123 | 7/1971 | Williamson et al. | 322/99 X |

Primary Examiner—James D. Trammell
Attorney—Ralph F. Merchant et al.

[57] ABSTRACT

A ground detection apparatus for detecting and warning of a ground condition in the rotating field windings of rotating electrical machinery. A plurality of light emitting diodes mounted for rotation with the rotating field of an electrical machine transmit light energy as they rotate. A control circuit also mounted for rotation with the rotating field and connected to the light emitting diodes causes the light emitting diodes to change their energy transmission state upon a ground in the rotating field windings. Light sensitive sensors are mounted in a fixed nonrotating position so as to receive the light energy transmitted by the light emitting diodes and produce an output signal upon such receipt. The light sensitive sensors are connected through signal conditioning circuits to an alarm. The alarm provides an indication of a grounded field winding condition after the grounded condition has been maintained for a predetermined time.

9 Claims, 5 Drawing Figures

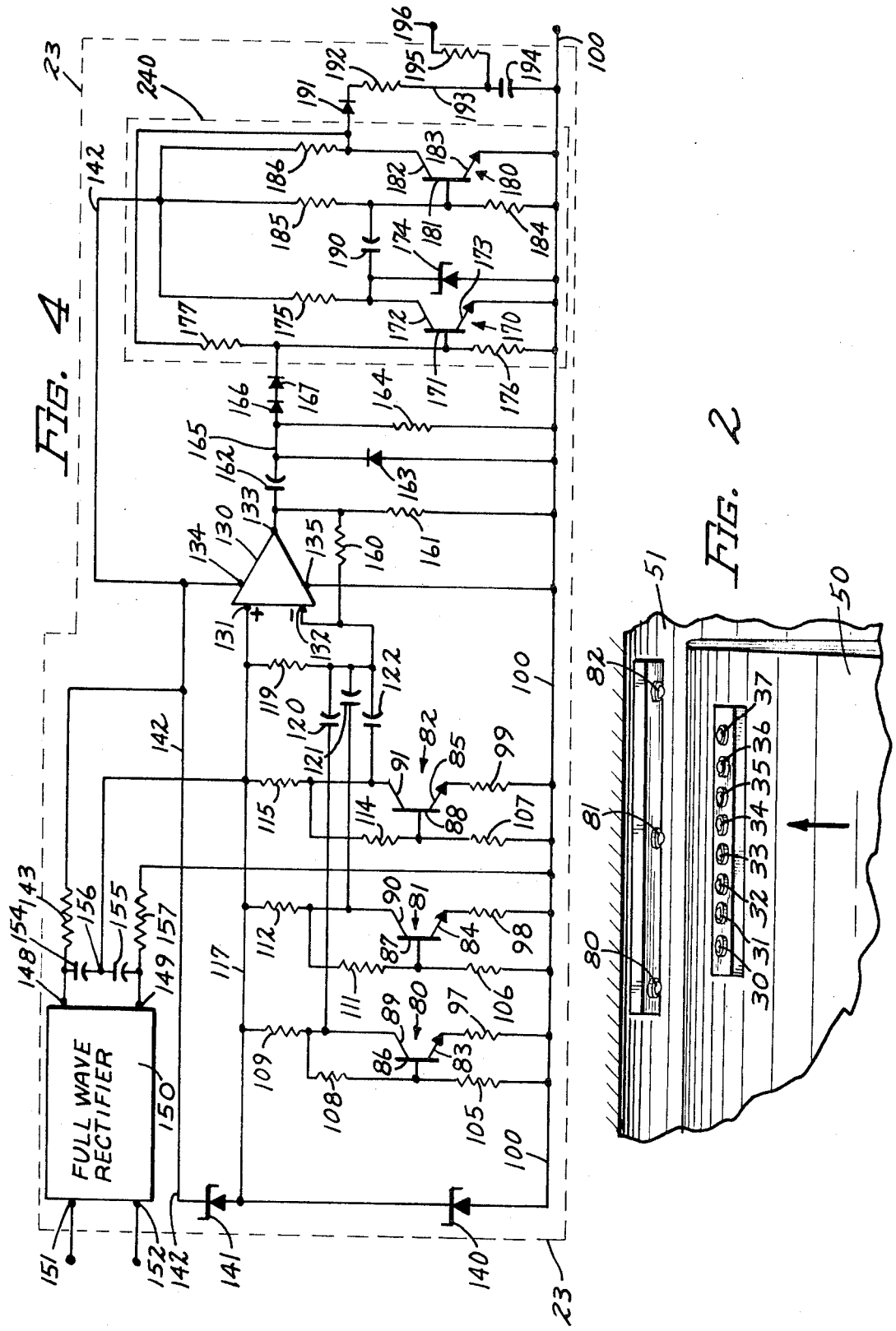

BRUSHLESS GENERATOR FIELD GROUND DETECTION SYSTEM

BACKGROUND OF THE INVENTION

Rotating electrical machinery, in particular AC brushless generators, depend upon isolated and non-grounded rotating field windings for proper operation. A grounded rotating field winding if undetected, may result in severe and costly damage to the AC brushless generator of which it is a part and in consequent multiple damage to equipment powered by the generator. This effect becomes particularly significant in the case of very large generators supplying critical power to users who may be severely damaged by a sudden power fluctuation or reduction. Early detection of a grounded rotating field winding is particularly important since a rotating electrical machine having a field consisting of multiple windings may continue to operate in apparently normal fashion even after one or more of the rotating field windings has become grounded. As individual field windings become grounded, the overall field resistance decreases causing increased current to flow through the windings. As a result, the remaining non-grounded field windings are subjected to an above normal current stress and become more susceptible to grounding. Therefore, a point is reached whereupon the subsequent grounding of additional rotating field windings, with the cascaded effect of lower field winding resistance and proportionately higher currents, results in the destruction of the rotating field. It is important, therefore, for those maintaining and using the generator to become aware of a grounded rotating field winding immediately upon its occurrence so that corrective action can be initiated either immediately or at regular maintenance intervals before catastrophic results inure.

It is impractical, costly, and in most cases virtually impossible to periodically turn off large electrical rotating machines to check the field windings for a grounded condition. Therefore, it is of great importance to continuously monitor the rotating field windings during operation for a grounded condition and to positively indicate when such a grounded condition has occurred. In the past, grounded field winding tests on rotating equipment have been practical only on electric machines having brushes and slip rings since these devices provide the media by which a rotor mounted field winding detector can communicate with the external world. Brushless AC generators have neither brushes nor slip rings and, therefore, have no mechanical link by which a rotor mounted field winding detector can communicate its information beyond the confines of the rotor. Attempts to provide a rotor mounted field winding detector with conventional light source transmission means have proved to be impractical due to the relatively short life of the conventional (incandescent) light sources as compared to the mean time between failures occurring as a result of grounded rotating field windings.

The present invention provides a highly reliable and long life ground detecting apparatus that continuously monitors the rotating field windings of a rotating electrical machine for a grounded condition and immediately thereafter communicates both visually and by an alarm external of the generator the fact that a grounded field winding condition has occurred. While the present invention will be described in conjunction with its use in a AC brushless generator it will be understood that the invention is not limited to this use and can be used for detecting a grounded condition in the rotating field windings of any rotating electrical machine. Further, while the present invention as described uses light emitting diodes as the means for transmitting information from the rotor to the non-rotating generator housing, it will be understood that any equivalent energy transmitting means can be used without departing from the spirit or intent of this invention.

SUMMARY OF THE INVENTION

In the present invention a plurality of energy transmitting devices, such as light emitting diodes, are axially spaced on, and mounted for rotation with the rotor of an AC brushless generator. When energized the light emitting diodes emit light energy as they rotate with the rotor. Several of the light emitting diodes emit visible light while those remaining emit infrared light.

A ground detecting control circuit also mounted for rotation with the brushless generator rotor is connected to one terminal of the rotating field winding and monitors same for a grounded condition. The ground detecting control circuit is connected to, and energizes the light emitting diodes in the absence of a grounded field winding condition. Upon detecting a ground in the rotating field windings, the ground detecting control circuit de-energizes the light emitting diodes. Therefore, the light emitting diodes provide an indication of a grounded condition in the rotating field windings.

Light sensitive sensors, axially spaced and mounted in a fixed nonrotating position on the housing of the brushless generator are oriented so as to receive light energy transmitted by the rotating light emitting diodes as they pass in close proximity to the light sensitive sensors. When the sensors become activated by the infrared light transmitted by the light emitting diodes they produce an electrical output signal. When the light emitting diodes are not in close proximity with the sensors or when they are de-energized and therefore are not transmitting light the light sensitive sensors produce no output signal.

A signal conditioning circuit containing an amplifier, a pulse stretcher, and an integrator connects the light sensitive sensors to an alarm indicator. The signal conditioning circuit expands the narrow output pulse signals of the light sensitive sensors to produce a nearly continuous output signal. As long as periodic output pulse signals appear at the output of the light sensitive sensors, this expanded output signal is generated. The expanded output signal deactivates the alarm indicator. When the light sensitive sensors fail to receive infrared light from the light emitting diodes and thereby fail to produce output pulse signals, the output of the signal conditioning circuit is diminished and the alarm indicator is activated. The alarm indicator indicates an alarm only after continuous activation for a predetermined time, which is adjustable. Therefore, the light emitting diodes must fail to transmit infrared energy for a number of rotor revolutions before an actual alarm indication will occur.

It is one object of the present invention, therefore, to provide an improved ground detecting apparatus for rotating electrical machinery.

It is another object of the present invention to provide an improved ground detecting apparatus for rotating electrical machinery wherein light emitting diodes transmit information of the grounded field condition.

It is a further object of the present invention to provide a ground detecting apparatus for the field windings of an AC brushless generator wherein the ground detecting and information transmitting circuits rotate with the rotating field winding.

It is a further object of the present invention to provide a ground detecting apparatus for the rotating field windings of an AC brushless generator wherein an indication of a grounded field condition is displayed both visually and by an alarm.

These and other objects of my invention will become apparent to those skilled in the art upon consideration of the accompanying specification, claims and drawings.

BRIEF DESCRIPTION OF THE DRAWINGS

Referring to the drawings, wherein like numerals represent like parts throughout the several views;

FIG. 2 is a diagrammatic view of the relative positioning of the light emitting diodes and the light sensitive sensors of the present invention;

FIG. 4 is a schematic representation of the energy sensor and signal conditioning circuit portions of the present invention disclosed in FIG. 1.

DESCRIPTION OF THE PREFERRED EMBODIMENT

Figure 1:
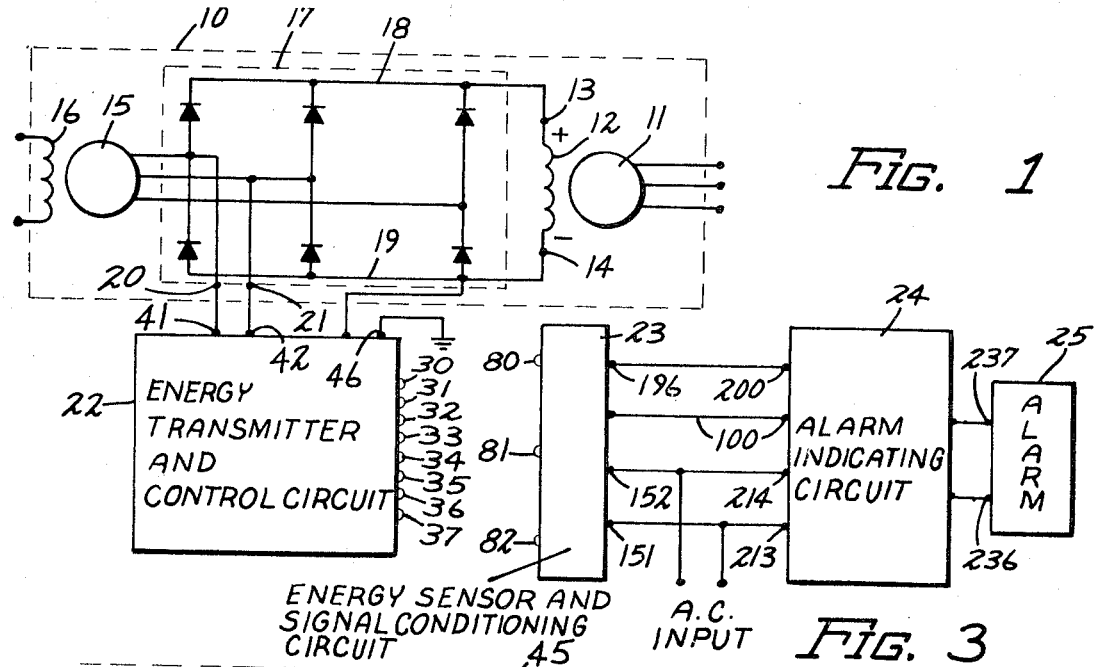
FIG. 1 is a diagrammatic representation of the functional blocks of the present invention.

Referring to the figures there is generally shown, in FIG. 1, an AC brushless generator 10, the description and operation of which are well known in the art and will not be detailed here. In general, the AC brushless generator 10 comprises: an AC generator 11, rotating field windings 12 having positive terminals 13 and negative terminals 14, a brushless exciter 15, an exciter field 16, and a brushless exciter diode wheel 17 having a plurality of rectifying diodes, a positive buss 18 connected to the positive terminals 13 of rotating field windings 12 and a negative buss 19 connected to the negative terminals 14 of rotating field windings 12. The brushless exciter diode wheel 17 further has AC outputs 20 and 21. The rotating field windings 12, the brushless exciter 15, and the brushless exciter diode wheel 17 are mounted to and rotate with a rotor 50 of the AC brushless generator 10. The AC generator 11 and the exciter field 16 are attached to a stationary housing 51 of the AC brushless generator 10. An energy transmitter and control circuit 22 is mounted to the brushless exciter diode wheel 17 and rotates at the generator speed. An energy sensor and signal conditioning circuit 23 is mounted to the stationary housing 51. An alarm indicating circuit 24 and an alarm 25 are not physically a part of the energy sensor and signal conditioning circuit 23 and, therefore, may be located at a position remote to that of the AC brushless generator 10.

Figure 3:
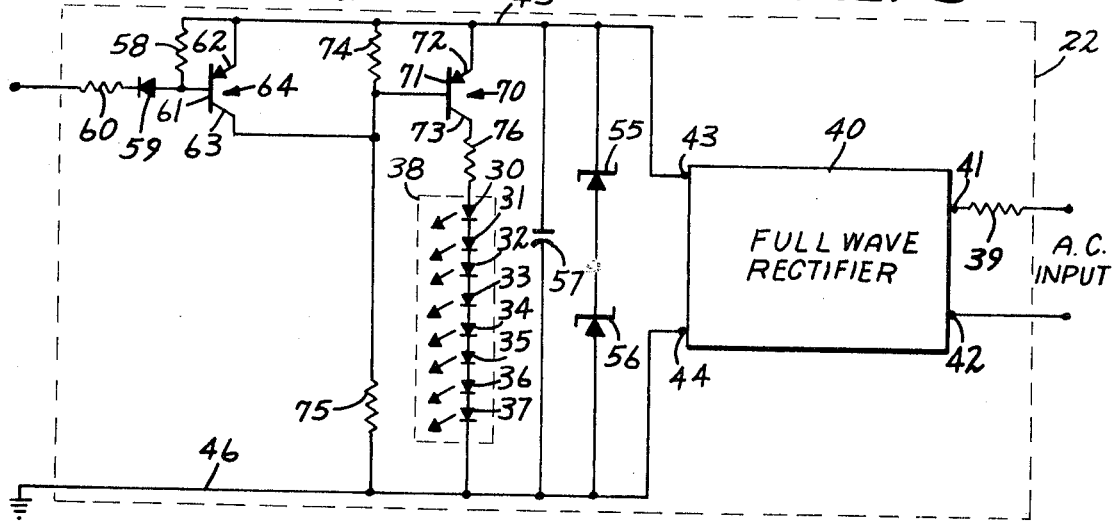
FIG. 3 is a schematic representation of the energy transmitter and control circuit portions of the present invention disclosed in FIG. 1.

AC outputs 20 of brushless exciter 15 is connected by means of a limiting resistor 39 to a first input 41 of a full wave rectifier 40, FIG. 3. Full wave rectifier 40 further has a second input 42, a DC output 43 and a common output 44. The second input 42 is connected to AC output 21 of brushless exciter 15. The full wave rectifier 40, as are all further full wave rectifiers described herein, is a conventional isolated full wave AC to DC converter with a transformer input. DC output 43 of full wave rectifier 40 is connected by means of a conductor 45, serially connected zener diodes 55 and 56, and a conductor 46 to common output 44 of full wave rectifier 40. A filter capacitor 57 is connected between the conductors 45 and 46. A resistor 58 is connected from conductor 45 to a base 61 of a PNP transistor 64. PNP transistor 64 further has an emitter 62 and a collector 63. Emitter 62 of PNP transistor 64 is connected directly to conductor 45, while collector 63 of PNP transistor 64 is connected by means of a resistor 75 to conductor 46, and by means of a resistor 74 to conductor 45. The base 61 of PNP transistor 64 is connected by means of a diode 59 in series with a resistor 60 to the negative terminals 14 of the rotating field windings 12 of an AC brushless generator 10 to provide a closed circuit path in th event that the field windings 12 of the AC brushless generator 10 should become grounded. Collector 63 of PNP transistor 64 is further connected to a base 71 of PNP transistor 70. PNP transistor 70 further has an emitter 72 and a collector 73. The emitter 72 of PNP transistor 70 is directly connected to conductor 45, while the collector 73 of PNP transistor 70 is connected by means of a resistor 76 in series with a plurality of light emitting diodes (LED's) 30, 31, . . . 37 to conductor 46. Conductor 46 is connected to the ground of rotor 50 of the AC brushless generator 10.

FIG. 4 shows a plurality of light sensitive transistors 80, 81 and 82. Light sensitive transistors 80, 81 and 82 have respectively: emitters 83, 84 and 85; bases 86, 87 and 88; and collectors 89, 90 and 91. Emitters 83, 84 and 85 of light sensitive transistors 80, 81 and 82 are respectively connected by means of resistors 97, 98 and 99 to a conductor 100. Collectors 89, 90 and 91 of light sensitive transistors 80, 81 and 82 are respectively connected by means of capacitors 120, 121 and 122 to a negative input 132 of an operational amplifier 130, and further by means of resistors 109, 112, and 115 respectively in series with a conductor 117 to a positive input 131 of operational amplifier 130. Operational amplifier 130 further has a bias input 134, a positive output 133 and a common output 135. Bases 86, 87 and 88 of light sensitive transistors 80, 81 and 82 respectively connected by means of resistors 108, 111, and 114 to the collectors 89, 90 and 91 of light sensitive transistors 80, 81 and 82. In addition, bases 86, 87 and 88 of light sensitive transistors 80, 81 and 82 are respectively connected by means of bias resistors 105, 106 and 107 to conductor 100. A resistor 119 is connected between the positive input 131 and the negative input 132 of operational amplifier 130. Conductor 117 is connected by means of a zener diode 140 to conductor 100, and serially, by means of a zener diode 141, a conductor 142, and a resistor 143 to a positive DC bias output 148 of a full wave rectifier 150. Full wave rectifier 150 further has a common DC bias output 149 and AC inputs 151 and 152. A capacitor 154 and a capatitor 155 are serially connected between positive DC bias output 148 and the common DC bias output 149 of full wave rectifier 150. A common junction 156 between capacitors 154 and 155 is connected directly to conductor 117. Common DC bias output 149 of full wave rectifier 150 is connected by means of a resistor 157 to conductor 100. Bias input 134 of operational amplifier 130 is directly connected to conductor 142. The positive output 133 of operational amplifier 130 is connected by means of a resistor 160 to the negative input 132 of operational amplifier 130, by means of a resistor 161 to conductor 100, and by means of a capacitor 162 to a conductor 165. A reverse biased diode 163 and a resistor 164 are connected in parallel between conductor 165 and conductor 100. Conductor 165 is serially connected by means of a diode 166 and a diode 167 to the base 171 of an NPN transistor 170. NPN transistor 170 further has an emitter 173 and a collector 172. Emitter 173 of NPN transistor 170 is directly connected to conductor 100. Collector 172 of NPN transistor 170 is connected by means of a resistor 175 to conductor 142 and by means of a zener diode 174 to conductor 100. Base 171 of NPN transistor 170 is connected by means of a resistor 176 to conductor 100 and by means of a resistor 177 to the collector 182 of an NPN transistor 180. NPN transistor 180 further has an emitter 183 and a base 181. Emitter 183 of NPN transistor 180 is directly connected to conductor 100. Base 181 of NPN transistor 180 is connected by means of a resistor 184 to conductor 100 and by means of a resistor 185 to conductor 142. A capacitor 190 is connected between the collector 172 of NPN transistor 170 and the base 181 of NPN transistor 180. Collector 182 of NPN transistor 180 is connected by means of a resistor 186 to conductor 142 and is further serially connected by means of a diode 191 and a resistor 192 to a conductor 193 and conductor 100. Conductor 193 is connected by means of a resistor 195 to an output 196 of the energy sensor and signal conditioning circuit 23.

Figure 5:
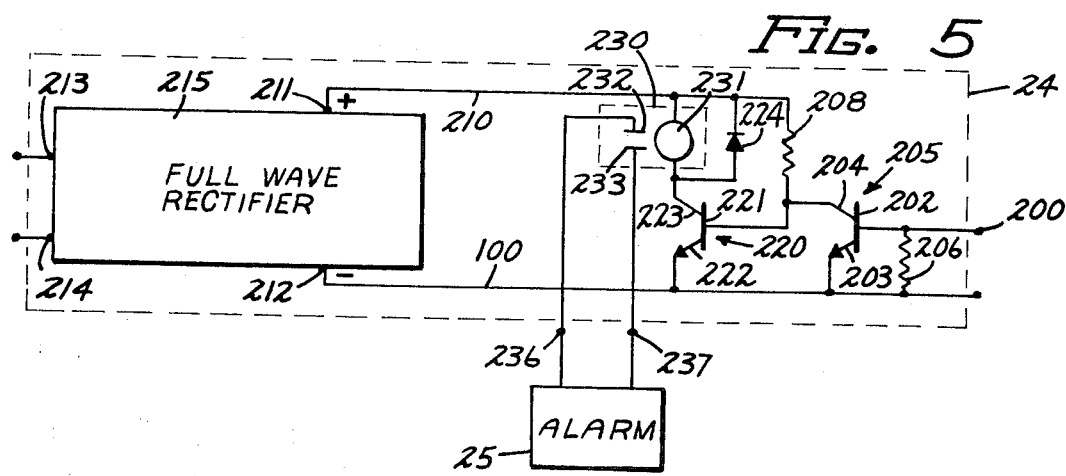
FIG. 5 is a schematic representation of the alarm and alarm indicating circuits of the present invention disclosed in FIG. 1.

Referring to FIG. 5, output 196 of the energy sensor and signal conditioning circuit 23 is connected through an input 200 of the alarm indicating circuit 24 to the base 202 of an NPN transister 205. NPN transistor 205 further has an emitter 203 and a collector 204. Emitter 203 of NPN transistor 205 is directly connected to conductor 100. Base 202 of NPN transistor 205 is connected by means of a resistor 206 to conductor 100. Collector 204 of NPN transistor 205 is serially connected by means of a resistor 208 and a conductor 210 to a positive DC bias output 211 of a full wave rectifier 215. Full wave rectifier 215 further has a DC common output 212 and AC inputs 213 and 214. AC inputs 213 and 214 of full wave rectifier 215 are respectively connected to AC inputs 151 and 152 of full wave rectifier 150. DC common output 212 of full wave rectifier 215 is directly connected to conductor 100. Collector 204 of NPN transistor 205 is further directly connected to a base 221 of an NPN transistor 220. NPN transistor 220 further has an emitter 222 and a collector 223. Emitter 222 of NPN transistor 220 is directly connected to conductor 100. Collector 223 of NPN transistor 220 is connected by means of a diode 224 to conductor 210 and by means of a coil 231 of a time delay relay 230 to conductor 210. Time delay relay 230 also has series contacts 232 and 233 normally open when there is no current flow through coil 231. Series contacts 232 and 233 of time delay relay 230 are connected to inputs 236 and 237 respectively of the alarm 25.

LED's 30, 31 . . . 37 are axially spaced and mounted on the rotor 50 of the AC brushless generator 10, as illustrated in FIG. 2. The LED's comprise the energy transmitter 38 section of the preferred embodiment. Light sensitive transistors 80, 81 and 82 are axially spaced on the stationary housing 51 of the AC generator 10, and are relatively spaced with respect to LED's 30, 31, . . . 37, as also illustrated in FIG. 2. In FIG. 3 there is shown a system using eight LED's; however, it should be understood that within the present invention, any number of desired LED's can be used. Similarly, in FIG. 4, there is shown a system using as sensors three light sensitive transistors; however, it should be understood that within the present invention any number of desired light sensitive semiconductors can be used.

OPERATION OF THE PREFERRED EMBODIMENT

In normal operation, the LED's 30, 31, . . . 37 emit light when energized as they spin with the rotor 50. In the preferred embodiment, two of the light emitting diodes are selected so as to emit visible light, while the remaining six LED's are selected so as to emit infrared light. It should be understood, however, that the light emitting diodes may be selected so as to emit any appropriate wave length of light energy without departing from the spirit or intent of this invention. It should be further understood, that although the preferred embodiment employs light energy transmission and sensor means, in general, other types of energy transmission and sensor means utilizing varied energy forms such as sound energy, ultrasonic energy, radio frequency energy or heat energy can be employed within the spirit and intent of this invention.

Referring to the figures, the energy transmitter and control circuits 22 are powered by an AC signal received from the AC outputs 20 and 21 of the brushless exciter diode wheel 17. The relatively high voltage AC signal is limited by limiting resistor 39, and is rectified by full wave rectifier 40 which provides a DC signal through the DC bias output 43 to conductor 45. The reverse biased series zener diodes 55 and 56 provide a constant DC potential on conductor 45. Capacitor 57 provides filtering to ground for AC signals appearing on conductor 45. Conductor 46 is grounded to the rotor 50. The base 61 of PNP transistor 64 monitors the negative terminals 14 of the rotating field windings 12 through diode 59 and resistor 60 and is held in a nongrounded condition as long as a ground does not occur in the rotating field windings 12. Therefore, although the emitter 62 and the collector 63 of PNP transistor 64 are biased in a manner tending to cause PNP transistor 64 to conduct, PNP transistor 64 will in fact be held in a nonconducting state due to its floating base 61. However, transistor 70 is properly biased for conduction and will in fact conduct causing current to flow through resistor 76, LED's 30, 31, . . . 37 and conductor 46 to ground. Therefore, when the negative terminals 14 of the rotating field windings 12 are in a non-grounded condition the plurality of LED's 30, 31, . . . 37 will conduct and thereby emit light energy. Upon the occurrence of a ground (said ground being identical to that appearing on conductor 46) in the negative terminals 14 of the rotating field wingdings 12, a conduction path will be provided from conductor 45 through resistor 58, diode 59, and resistor 60 to ground. Said conduction will cause PNP transistor 64 to conduct, thereby shorting out the emitter 72 to base 71, junction of PNP transistor 70. PNP transistor 70, therefore, will not conduct and will deenergize LED's 30, 31, . . . 37. A person visually observing the rotating LED's can observe their extinguished condition and can thereupon infer that a grounded condition has occurred in the rotating field windings 12.

The LED's 30, 31, . . . 37 and the light sensitive transistors 80, 81 and 82 have been relatively spaced in the preferred embodiment as illustrated in FIG. 2. Namely, the light sensitive transistors 80, 81 and 82 are fewer in number and axially spaced farther apart than are the LED's 30, 31, . . . 37. The relative spacings and number of components used is a design choice based upon the particular application of the invention. The specific arrangement of the preferred embodiment permits the rotor 50 to move in the axial direction without interfering with the transmission and receipt of the LED light energy of the present invention. Said axial motion of the rotor 50 occurs as a result of normal end play.

The energy sensor and signal conditioning circuit 23 and the alarm 25 and alarm indicating circuit 24 are powered by external AC power applied to the AC inputs 151, 152 and 213, 214, respectively, of full wave rectifiers 150 and 215. DC bias power is provided for the energy sensor and signal conditioning circuit by the full wave rectifier 150, filter capacitors 154 and 155 and voltage regulation zener diodes 140 and 141 utilized in a conventional manner, well known in the art. DC bias power for the alarm 25 and alarm indicating circuit 24 is provided by the full wave rectifier 215.

When there are no grounds in the rotating field windings 12, the light sensitive transistors 80, 81 and 82 receive infrared light transmitted by the rotating LED's 30, 31, . . . 37 on each revolution when said LED's are in close proximity with said light sensitive sensors. Upon receipt of the infrared light energy, light sensitive transistors 80, 81 and 82 are energized and cause a pulse signal to be produced at their respective collectors 89, 90 and 91. The pulse signals are transmitted through capacitors 120, 121 and 122 causing a signal to appear across resistor 119 and, therefore, also across the positive input 131 and the negative input 132 of operational amplifier 130. Operational amplifier 130 amplifies the received input pulses, thereby causing an amplified pulse to be applied through capacitor 162 and series diodes 166 and 167 to the base 171 of NPN transistor 170. It should be understood that the operational amplifier 130 will produce an amplified pulse as a result of an input signal received from any one or all of light sensitive transistors 80, 81 and 82. NPN transistors 170 and 180, zener diode 174, capacitor 190, resistors 175, 176, 177, 184, 185, and 186 as connected in the preferred embodiment illustrated in FIG. 4, comprise the elements of a monostable multivibrator pulse stretching circuit 240, the operation of which is well known in the art and will not be described herein. The monostable multivibrator pulse stretching circuit 240 functions to produce at the collector 182 on NPN transistor 180 a pulse of larger width than that of the pulse applied to the base 171 of NPN transistor 170. Although the present embodiment employs a monostable multivibrator pulse stretching circuit it is understood that any comparable pulse stretching means may be used without departing from the spirit and intent of this invention. Similarly, although the present embodiment employs an operational amplifier, any suitable amplifying means may be used without departing from the spirit or intent of this invention. The expanded pulse applied to diode 191 passes through resistor 192 to integrating capacitor 194 where it is integrated with respect to time. The pulse integration causes a positive signal to appear between the output 196 and conductor 100 of the energy sensor and signal conditioning circuit 23; the signal at output 196 is positive with respect to conductor 100.

Referring to FIG. 1 and FIG. 5, NPN transistor 205, upon receiving a positive integrated signal at its base 202, will conduct and thereby short out the base 221 to emitter 222 junction of NPN transistor 202. NPN transistor 202 will, therefore, not conduct, and no current will flow through coil 231 of time delay relay 230. The series contacts 232 and 233 of time delay relay 230 will be open, causing alarm 25 to be de-energized. Therefore, when a no ground condition appears in the rotating field windings 12 the alarm 25 will not be activated.

Upon the occurrence of a ground in the rotating field windings 12 the LED's 30, 31, . . . 37 will be extinguished and will not transmit infrared light to the light sensitive transistors 80, 81 and 82. In consequence, no signal will be available for amplification by the operational amplifier 130; no input signal will be applied to the monostable multivibrator pulse stretching circuit 240; and the charge on integrating capacitor 194 will dissipate to a zero or to a low point such that the signal applied to the base 202 of NPN transistor 205 will hold said transistor in a nonconducting state. Thereupon, the voltage at the base 221 of NPN transistor 220 will rise causing transistor 220 to conduct and a current to flow through coil 231 of time delay relay 230. Time delay relay 230 is constructed such that current must flow through its coil 231 for a predetermined time before its series contacts 232 and 233 will close. In the preferred embodiment the time delay is from 2½ to 10 seconds. The delay is adjustable by design. Upon closing of the series contacts 232 and 233 alarm 25 is activated.

While I have disclosed a specific embodiment of my invention, it is to be understood that this is for the purpose of illustration only, and that my invention is to be limited soley by the scope of the appended claims.

I claim:

1. Ground detecting apparatus for rotating electrical machinery having a rotating field winding comprising:
   a. energy transmitting means operable at a first state wherein energy is transmitted at a first level and at a second state wherein energy is transmitted at a second level different from said first level;
   b. means mounting said energy transmitting means for rotation with a rotor of an electrical machine; and
   c. control means mounted for rotation with the rotor of said electrical machine and connected to said energy transmitting means, said control means operable to cause said energy transmitting means to change from its first state to its second state upon the occurrence of a ground in said rotating field winding.

2. Ground detecting apparatus according to claim 1, wherein said energy transmitting means comprises light emitting semiconductor means.

3. Ground detecting apparatus according to claim 1, including energy sensing means mounted in a fixed nonrotating position external of said rotor and operable to sense energy transmission from said energy transmitting means and to produce an indication when said energy transmission changes from said first state to said second state.

4. Ground detecting apparatus according to claim 3, wherein said energy transmitting means comprises light emitting semiconductor means and said sensing means comprises light sensitive sensors connected by circuit means to an alarm indicating means.

5. Ground detecting apparatus for a brushless generator having a rotor mounted for rotation in a stationary housing comprising:
   a. light emitting semiconductor means mounted for rotation with said rotor and operable at a first state wherein energy is transmitted at a first level and at a second state wherein energy is transmitted at a second level different from said first level;
   b. first circuit means connected to said light emitting semiconductor means operable to detect a ground in a field winding of said rotor and thereupon cause said light emitting semiconductor means to change from its first state to its second state;
   c. light sensitive sensing means mounted on said housing oriented so as to receive and to become activated by one of said first and second levels of energy transmitted from said light emitting semiconductor means;
   d. second circuit means connected to said sensing means providing a output signal upon activation of said sensing means; and
   e. alarm indicating means connected to said second circuit means to provide an indication in response to an output signal from said second circuit means.

6. Ground detecting apparatus according to claim 5 wherein said light emitting semiconductor means comprises a plurality of light emitting diodes axially spaced along said rotor, a first group of said light emitting diodes emitting infrared light and a second group of said light emitting diodes emitting visible light when said light emitting diodes are in said first state, and wherein said light sensitive sensing means comprises a plurality of light sensitive sensors axially spaced on said housing and oriented so as to receive and to become activated by said infrared light when said light emitting diodes are in close proximity with said light sensitive sensors.

7. Ground detecting apparatus according to claim 6, wherein said first circuit control means comprises:
   a. an AC input;
   b. means providing a DC bias source from said AC input;
   c. first switching means connected in series with said plurality of light emitting diodes between said DC bias source and said rotor, said first switching means normally biased in a conducting state;
   d. second switching means having a control electrode connected to a field winding of said rotor in a manner normally tending to hold said second switching means in a nonconductive state, and tending to hold said second switching means in a conducting state upon the occurrence of a ground in said field winding; and
   e. means connecting said second switching means to a control electrode of said first switching means in a manner tending to hold said first switching means in a nonconduting state when said second switching means is in a conducting state, and further, to hold said first switching means in a conducting state when said second switching means is in a nonconducting state.

8. Ground detecting apparatus according to claim 6, wherein said second circuit means comprises:
   a. resistive input means connected to said sensors such that each of said sensors when energized produces a positive signal in said resistive input means;
   b. amplifier means having an input and an output;
   c. means connecting in parallel said resistive input means to the input of said amplifier means;
   d. a pulse stretching circuit having an input and an output, said pulse stretching circuit operable when energized to produce an expanded time base pulse of predetermined width at its output;
   e. means connecting the input of said pulse stretching circuit to the output of said operational amplifier means so as to cause narrow periodic amplified pulses at the output of said amplifier means to activate said pulse stretching circuit; and
   f. integrating circuit means connected to said pulse stretching circuit output in a manner causing signals appearing at said pulse stretching circuit output to be integrated with respect to time.

9. Ground detecting apparatus according to claim 8, wherein an alarm indicating means comprising a time delay circuit means is connected to said integrating circuit means and operable to provide an indication when an output signal has appeared from said integrating circuit means for a predetermined length of time.

* * * * *